(12) United States Patent
K. C.

(10) Patent No.: US 11,257,175 B1
(45) Date of Patent: Feb. 22, 2022

(54) SYSTEMS AND METHODS FOR PROTECTING USERS FROM SECURITY THREATS

(71) Applicant: NortonLifeLock Inc., Tempe, AZ (US)

(72) Inventor: Santhana Krishnan K. C., Chennai (IN)

(73) Assignee: NortonLifeLock Inc., Tempe, AZ (US)

( * ) Notice: Subject to any disclaimer, the term of this patent is extended or adjusted under 35 U.S.C. 154(b) by 15 days.

(21) Appl. No.: 16/990,915

(22) Filed: Aug. 11, 2020

(51) Int. Cl.
| | |
|---|---|
| *G06Q 30/06* | (2012.01) |
| *G06Q 50/10* | (2012.01) |
| *G06K 7/14* | (2006.01) |
| *G06Q 50/26* | (2012.01) |

(52) U.S. Cl.
CPC ......... *G06Q 50/265* (2013.01); *G06K 7/1413* (2013.01); *G06K 7/1417* (2013.01); *G06Q 30/0627* (2013.01)

(58) Field of Classification Search
None
See application file for complete search history.

(56) References Cited

U.S. PATENT DOCUMENTS

| | | | |
|---|---|---|---|
| 10,839,440 B2 * | 11/2020 | Amin | G06F 16/9537 |
| 2014/0156412 A1 * | 6/2014 | Tse | G06Q 30/0207 705/14.58 |
| 2017/0069010 A1 * | 3/2017 | Amin | G06F 16/9537 |
| 2021/0081998 A1 * | 3/2021 | Martinez Vazquez | G16H 10/60 |

FOREIGN PATENT DOCUMENTS

| | | | | |
|---|---|---|---|---|
| WO | WO-2017178843 A1 * | 10/2017 | | G06Q 30/0633 |

OTHER PUBLICATIONS

Anon., "XLerateHealth Selects Nine Healthcare Startups for 2019 Accelerator Cohort in Louisville, KY," Business Wire [New York] Jul. 30, 2019. (Year: 2019).*

* cited by examiner

*Primary Examiner* — Nicholas D Rosen
(74) *Attorney, Agent, or Firm* — FisherBroyles, LLP

(57) ABSTRACT

The disclosed computer-implemented method for protecting users from security threats may include (i) receiving a photograph of a target that a user is attempting to acquire, (ii) extracting, from the photograph, an identifier of the target, (iii) applying the identifier of the target to a software security policy that indicates whether the target is safe for the user, and (iv) releasing locked resources to enable the user to acquire the target based on a determination that the software security policy indicates that the target is safe for the user. Various other methods, systems, and computer-readable media are also disclosed.

20 Claims, 7 Drawing Sheets

SYSTEMS AND METHODS FOR PROTECTING USERS FROM SECURITY THREATS

BACKGROUND

There are many products that are unethical to provide to children or teenage minors in retail locations. Some examples may include toys that are not appropriate for a child's age, chocolates, adult toys, etc. Some products represent a choking hazard, such as marbles, coins, and balls that are 1.75 inches in diameter or less, because these products can become stuck in the throat above the windpipe. Similarly, it may be inappropriate or unethical to provide to children fireworks, scissors, cigarettes, or caffeine products. Along these lines, many products have been reported to the Consumer Product Safety Commission as potentially unsafe for children or teenage minors. The present disclosure, therefore, identifies and addresses a need for systems and methods for protecting users from security threats.

SUMMARY

As will be described in greater detail below, the present disclosure describes various systems and methods for protecting users from security threats. In one example, a computer-implemented method for protecting users from security threats may include (i) receiving a photograph of a target that a user is attempting to acquire, (ii) extracting, from the photograph, an identifier of the target, (iii) applying the identifier of the target to a software security policy that indicates whether the target is safe for the user, and (iv) releasing locked resources to enable the user to acquire the target based on a determination that the software security policy indicates that the target is safe for the user.

In one embodiment, the extracting the identifier of the target may include extracting a visual machine-readable code from the photograph. In one embodiment, the visual machine-readable code may include a one-dimensional visual machine-readable code. In one embodiment, the visual machine-readable code may include a two-dimensional visual machine-readable code.

In one embodiment, the software security policy indicates whether the target poses a threat to the health of the user. In one embodiment, the software security policy indicates whether the target poses a threat of causing the user to choke. In one embodiment, the software security policy indicates whether the target poses a threat of starting a fire. In one embodiment, the software security policy indicates whether the target matches an age of the user.

In one embodiment, a guardian of the user adjusts the software security policy. In one embodiment, a guardian of the user uploads through crowdsourcing an indication of whether the target poses a threat to the user.

In one embodiment, a system for implementing the above-described method may include (i) a reception module, stored in memory, that receives a photograph of a target that a user is attempting to acquire, (ii) an extraction module, stored in memory, that extracts, from the photograph, an identifier of the target, (iii) an application module, stored in memory, that applies the identifier of the target to a software security policy that indicates whether the target is safe for the user, (iv) a releasing module, stored in memory, that releases locked resources to enable the user to acquire the target based on a determination that the software security policy indicates that the target is safe for the user, and (v) at least one physical processor configured to execute the reception module, the extraction module, the application module, and the releasing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a photograph of a target that a user is attempting to acquire, (ii) extract, from the photograph, an identifier of the target, (iii) apply the identifier of the target to a software security policy that indicates whether the target is safe for the user, and (iv) release locked resources to enable the user to acquire the target based on a determination that the software security policy indicates that the target is safe for the user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
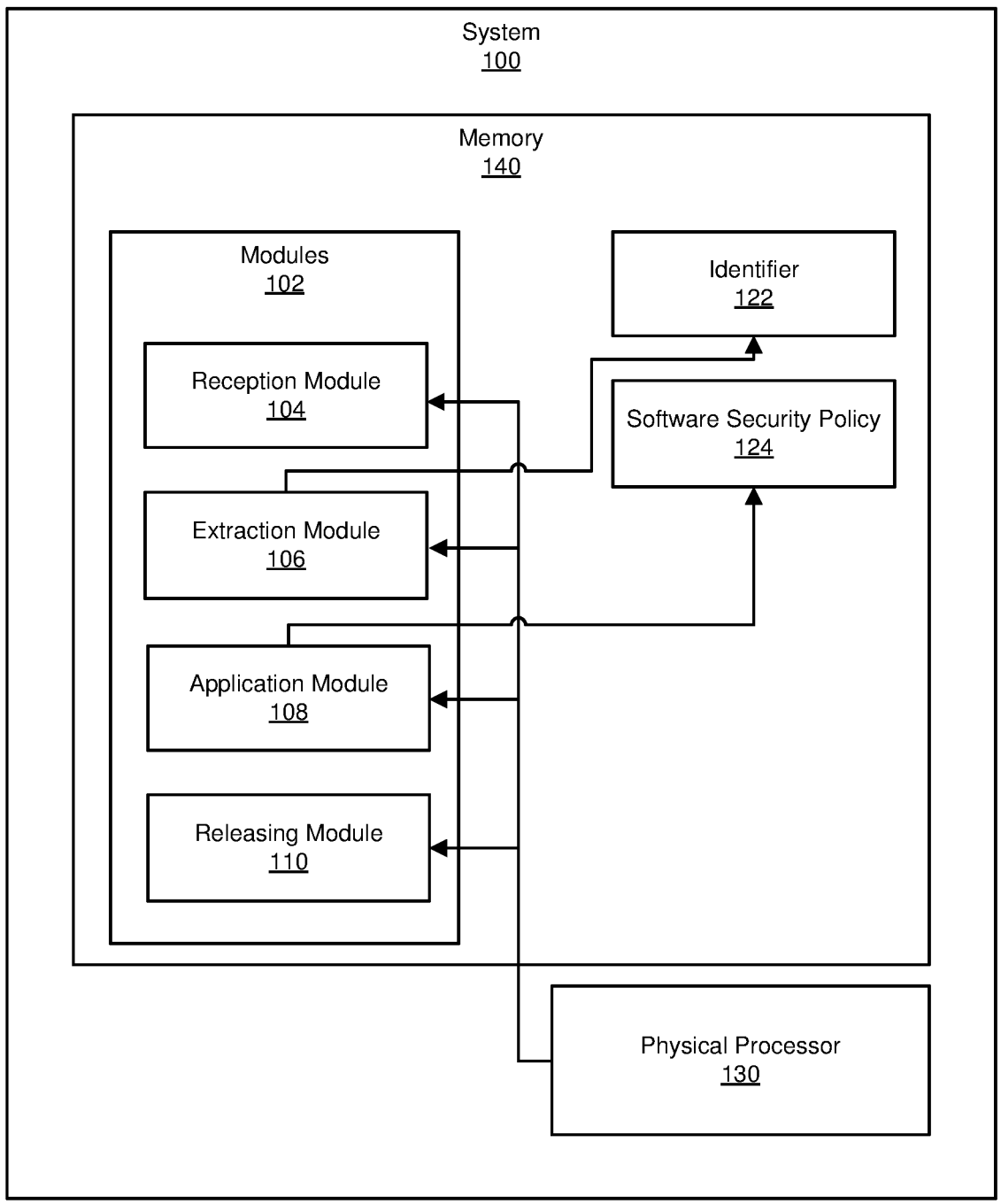
FIG. 1 is a block diagram of an example system for protecting users from security threats.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting users from security threats. The following will provide, with reference to FIGS. 1-2, detailed descriptions of example systems for protecting users from security threats. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for protecting users from security threats. As illustrated in this figure, example system 100 may include one or more modules 102 for performing one or more tasks. For example, and as will be explained in greater detail below, example system 100 may include a reception module 104 that receives a photograph of a target that a user is attempting to acquire. Example system 100 may additionally include an extraction module 106 that extracts, from the photograph, an identifier 122 of the target. Example system 100 may also include an application module 108 that applies identifier 122 of the target to a software security policy 124 that indicates whether the target is safe for the user. Example system 100 may additionally include a releasing module 110 that releases locked resources to enable the user to acquire the target based on a determination that the software security policy indicates that the target is safe for the user.

Releasing module 110 may further release locked resources to enable the user to acquire the target based on a determination that the software security policy indicates that the target is safe for the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users from security threats. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
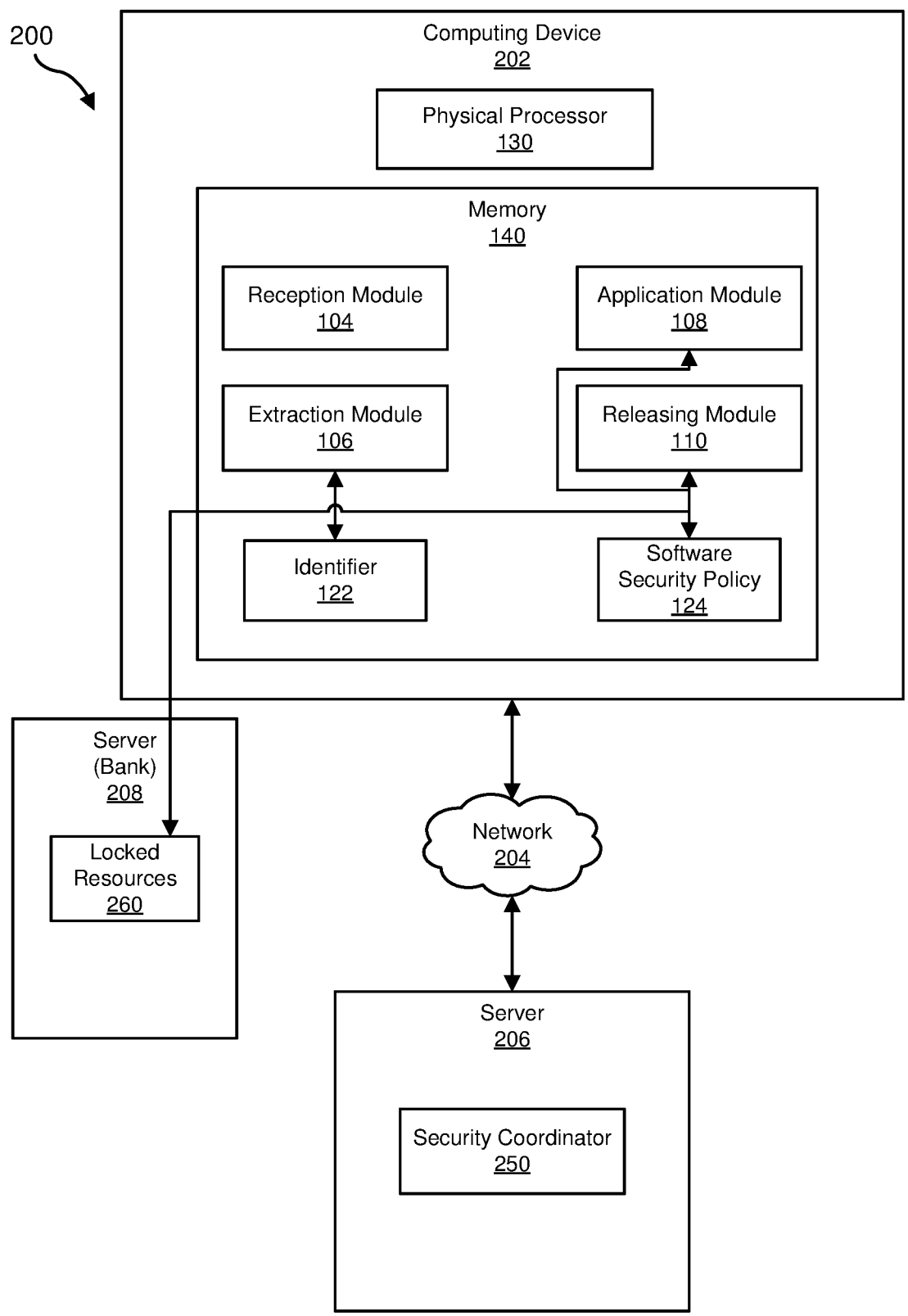
FIG. 2 is a block diagram of an additional example system for protecting users from security threats.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect users from security threats. For example, and as will be described in greater detail below, reception module 104 may receive a photograph of a target that a user is attempting to acquire. Extraction module 106 may extract, from the photograph, identifier 122 of the target. Application module 108 may apply identifier 122 of the target to software security policy 124 that indicates whether the target is safe for the user. Releasing module 110 may release locked resources 260 to enable the user to acquire the target based on a determination that software security policy 124 indicates that the target is safe for the user. As further shown in this figure, in one illustrative example locked resources 260 may be located within, and/or controlled by, a server 208 corresponding to a bank or financial institution. This figure also illustrates how the performance of method 300 by modules 102 may be facilitated by communication or coordination with a security coordinator 250 at a backend security server that corresponds to server 206.

Computing device 202 generally represents any type or form of computing device capable of reading computer-executable instructions. One illustrative example of computing device 202 corresponds to a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
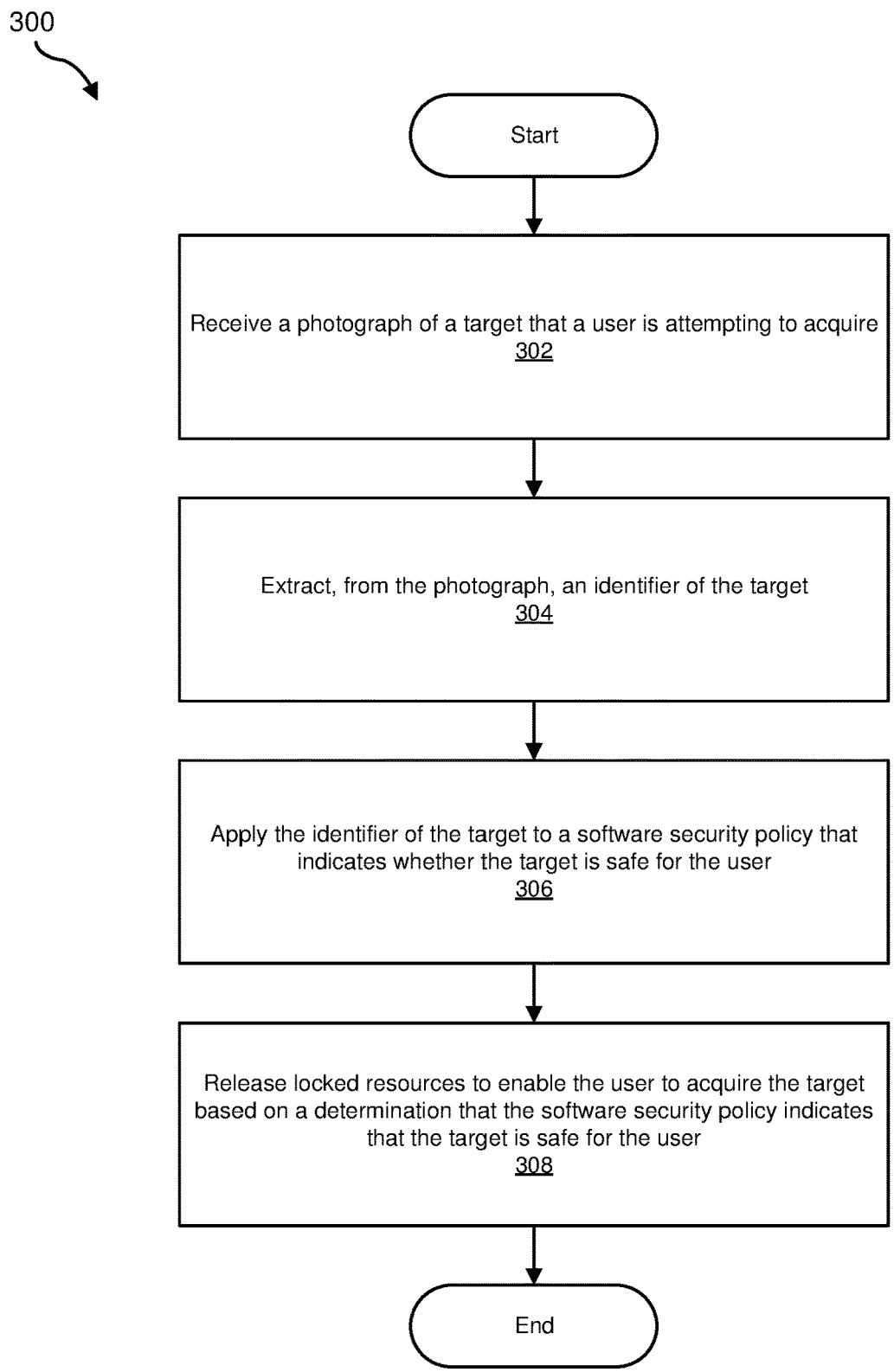
FIG. 3 is a flow diagram of an example method for protecting users from security threats.

FIG. 3 is a flow diagram of an example computer-implemented method 300 for protecting users from security threats. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive a photograph of a target that a user is attempting to acquire. For example, reception module 104 may, as part of computing device 202 in FIG. 2, receive a photograph of a target that a user is attempting to acquire.

As used herein, the term "photograph" generally refers to any image data captured by a camera. Accordingly, a photograph may refer to both a single-instance photograph, as well as one or more frames of a captured video.

Furthermore, as used herein, the term "target" generally refers to any item that the corresponding user is attempting to acquire or purchase, or otherwise considering whether to acquire or purchase. In one illustrative example, the user may correspond to a child protected by a parental control policy in accordance with method 300, and the target may correspond to a product within a retail location that the child is attempting to purchase.

Reception module 104 may receive the photograph in a variety of ways. Generally speaking, reception module 104 may be disposed within computing device 202, such as a smartphone, and this smartphone may belong to a child protected by a parental control policy in accordance with method 300. Accordingly, the child may open a camera application within the smartphone or otherwise access one or more applications that contain photography functionality. The child may orient an angle of the smartphone such that a camera of the smartphone will capture at least one photograph of the target. The child may also enter input, such as by pressing a button on a touchscreen of the smartphone, to trigger the capturing of at least one photograph of the target. In response to the camera capturing the photograph of the target, this information may be transmitted to, or shared with, reception module 104.

Figure 4:
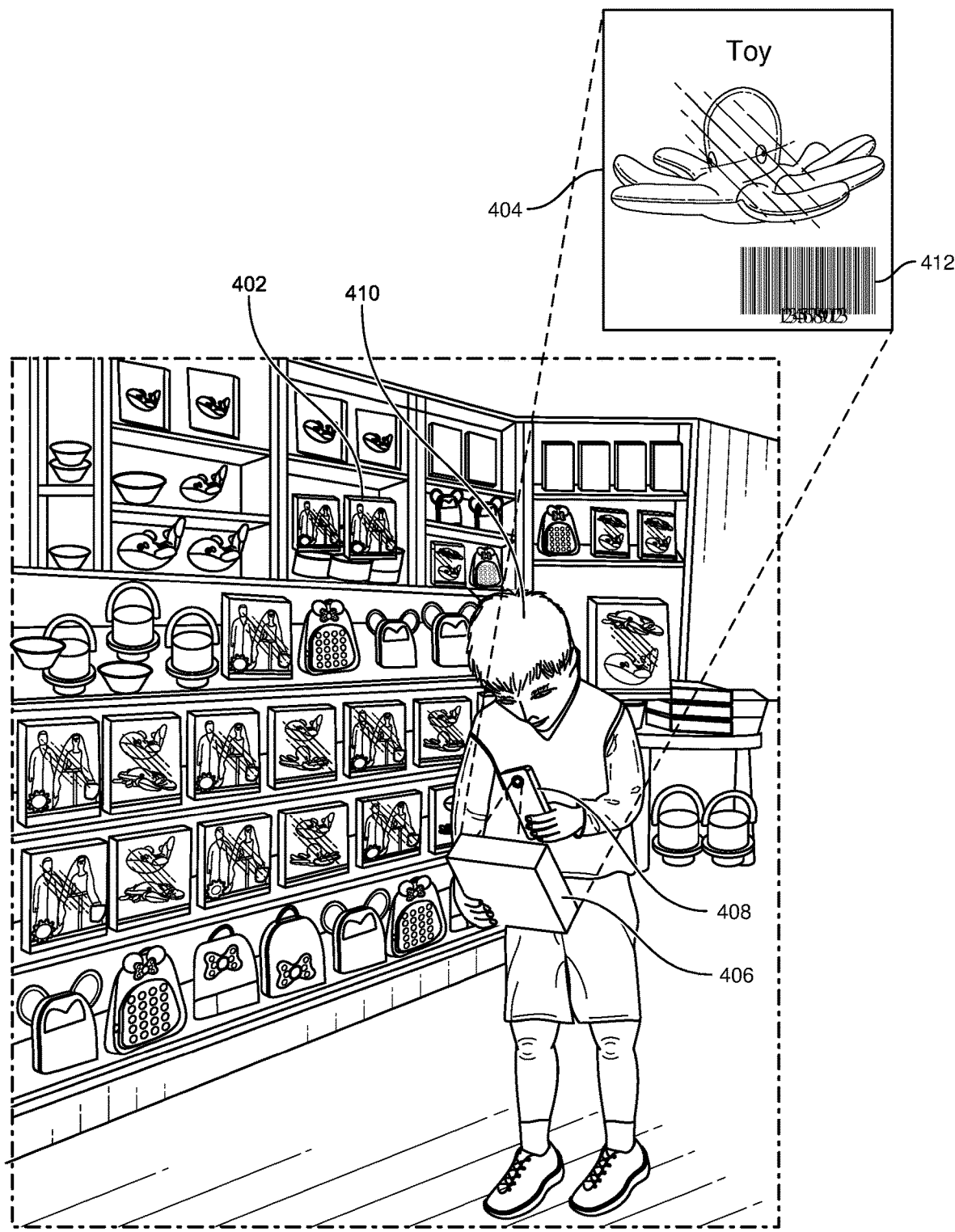
FIG. 4 is a diagram of a child in a toy store.

FIG. 4 shows an illustrative diagram that may correspond to step 302. In this example, a child 410 may hold the smartphone 408 in front of a target 406, such as a toy product within any toy store. The toy store may also include a number of different products available on corresponding shelves, including, for example, another product 402.

This figure also further illustrates how a packaging of target 406 may optionally include a visual depiction 412 of a corresponding identifier. In the particular example of FIG. 4, the visual depiction 412 of the corresponding identifier may correspond to a barcode, such as a one-dimensional barcode shown in FIG. 4. Visual depiction 404 may also correspond to a two-dimensional barcode, QR code, or any other suitable visual depiction of a target identifier in accordance with method 300, as discussed in more detail below.

At step 304, one or more of the systems described herein may extract, from the photograph, an identifier of the target. For example, extraction module 106 may, as part of computing device 202 in FIG. 2, extract, from the photograph, identifier 122 of the target. As used herein, the term "iden-tifier" generally refers to any number, code, and/or string that identifies a type of the target and/or identifies an instance of a type of the target. In some illustrative examples, the identifier may correspond to information included within a barcode for a product sold within a retail location, as further discussed above.

Extraction module 106 may extract the identifier in a number of ways. In summary, extraction module 106 may first search for, and ascertain, a location within, or a portion of, the photograph that contains the visual depiction of the identifier. For example, a one-dimensional barcode may have a particular format, shown in FIG. 4, and extraction module 106 may search for, and identify, a subset portion of the photograph that contains the barcode by identifying the subset portion that has features matching features expected of such barcodes. These features may include a size and/or shape of the barcode, including the expectation for vertical stripes of varying widths within the barcode, and/or optionally a numerical human-readable number associated with the barcode. In particular, FIG. 4 shows a callout 404 corresponding to the photograph captured by child 410 using smartphone 408, and this photograph includes a subset portion, in the lower right-hand quadrant, that includes visual depiction 412. After identifying the subset portion of the photograph, extraction module 106 may optionally decode the visual depiction of the identifier by translating image data and/or pixel values into a corresponding identifier for the target, such as a Universal Product Code or European Article Number (or International Article Number) code, as further discussed above.

At step 306, one or more of the systems described herein may apply the identifier of the target to a software security policy that indicates whether the target is safe for the user. For example, application module 108 may, as part of computing device 202 in FIG. 2, apply identifier 122 of the target to software security policy 124 that indicates whether the target is safe for the user.

As used herein, the phrase "apply the identifier of the target to the software security policy" generally refers to checking whether or not the software security policy indicates that the target constitutes a security threat or risk to the user. Accordingly, this phrase may refer to inputting the identifier of the target into a formula corresponding to the software security policy such that an output is generated indicating whether the target poses a threat. Applying the identifier may result in the generation of a binary decision, such as "yes" (the target indicates a threat) or "no" (the target does not indicate a threat). Additionally, or alternatively, applying the identifier may result in the generation of a granular score, and the granular score may indicate a measurement along one or more scales indicating a degree to which the target poses a threat to the user. In some examples, application module 108 may compare the granular score against a threshold to arrive at a binary decision, as further discussed above.

Moreover, as used herein, the phrase "indicating whether the target is safe for the user" generally refers to checking whether the target poses a threat to the user along any suitable or appropriate dimension, such as a dimension that may interest a parent or guardian (or other individual) protecting the user, such as a child, minor, employee, or handicapped individual. Illustrative examples of such dimensions may include a degree to which the target poses: a threat of choking (e.g., because the target has a length, height, or width or other dimension that is small enough and/or large enough to obstruct a windpipe), a threat of starting a fire (e.g., fireworks), and/or a threat of the user purchasing the target in contravention of criminal law (e.g., a minor purchasing an adult beverage or other adult product).

In some examples, the software security policy may specify whether a particular target constitutes a threat to the user based on a blanket conclusion that the particular target constitutes a threat to all children or all minors under the law. Additionally, or alternatively, the software security policy may specify whether a particular target constitutes a threat to the child based on an analysis that considers the specific age of the user or a specific age bracket into which the user is categorized. Accordingly, as children, minors, teenagers, handicapped individuals or other individuals grow older or more experienced, the results of applying the software security policy may evolve to reflect these changes. For example, a ball that may pose a choking hazard to a child aged five years old may not pose a parallel choking hazard to the child after the child has turned 15 years old.

In some examples, the software security policy may define allowed or disallowed targets on a per-target or per-product basis. In other words, each individual product or type of product may be identified on a blacklist or whitelist indicating whether the product is allowed to be purchased. Additionally, or alternatively, the software security policy may define features or combinations of features that are allowed or disallowed, and then application module 108 may apply the software security policy by ascertaining whether a candidate target contains the corresponding features or combinations of features. For example, the software security policy may prohibit any product having a feature of being flammable or may prohibit any product having a feature of presenting a choking hazard. Application module 108 and/or extraction module 106 may ascertain whether a candidate target contains one or more of these features, and application module 108 may thereby determine whether to allow or disallow a corresponding transaction.

In summary, the software security policy may include one or more default values, rules, sub-policies, or configurations, without necessarily receiving any configuration from a user, the user's guardian, or an administrator who purchased and/or set up the parental control software corresponding to method 300. The software publisher may establish these default values, which may include rules such as "balls or items 1.75 inches in diameter or less pose a threat of choking." Additionally, or alternatively, the software security policy may receive or establish one or more of these default values through crowdsourcing whereby one guardian customer of the parental control software may identify a particular product, or product feature, as posing a threat to children. The one guardian customer may then upload this information to a backend security server such as server 206, such that another distinct guardian customer may benefit from the information provided by the first guardian customer. Furthermore, the administrator or guardian for the user corresponding to method 300 may also personalize, tailor, or customize any one or more of these default values or crowdsourced values according to his or her preferences. For example, the administrator may determine that, although the default rule regarding balls and choking hazards may apply to most children, the administrator has a child who is particularly precocious and, therefore, the specific rule may be safely disabled under these particular circumstances.

At step 308, one or more of the systems described herein may release locked resources to enable the user to acquire the target based on a determination that the software security policy indicates that the target is safe for the user. For example, releasing module 110 may, as part of computing device 202 in FIG. 2, release locked resources 260 to enable the user to acquire the target based on a determination that software security policy 124 indicates that the target is safe for the user.

As used herein, the term "resources" in the context of step 308 generally refers to any resources, funds, capital, money, or other material that the user may provide in exchange to acquire the target. In one illustrative example, the resources may correspond to funds linked to a credit card or debit card or otherwise linked to a checking or other financial account for payment purposes. Similarly, as used herein, the term "locked resources" generally refers to any software configuration that prevents the user from releasing the resources unless the software security policy indicates that the corresponding target is safe for the user, as discussed above. In other words, a software configuration of the user's smartphone or other computing device, including potentially a configuration of parental control software active on the smartphone and/or configuration of a payment application or wallet application on the smartphone, and/or a configuration of a banking or financial server, such as server 208, may establish a limitation or prohibition on the ability of the user to release funds unless the software security policy authorizes that release.

Moreover, as used herein, the term "parental control software" generally refers to any software performing, or facilitating the performance of, method 300. Along these lines, the term "parental control software" is not necessarily limited to relationships between biological parents and children, but may also correspond to any relationship whereby one guardian provides some protection, monitoring, and/or control over a user, such as a minor, a child, an adopted child, a teenager, an employee, or a handicapped individual, etc., in accordance with method 300.

In some examples, the parental control software on computing device 202 and the payment application or wallet application on computing device 202 may be two separate and distinct applications. For example, the parental control software may be provided by a security vendor, such as NortonLifeLock, whereas the payment application or wallet application may be provided by separate and distinct vendors, such as GOOGLE or APPLE, or the payment application or wallet application may be provided by a bank or financial institution, etc. In examples where one or more of these applications or modules are separate and distinct, they may interact or coordinate through one or more application programming interfaces. For example, the parental control software may be configured to communicate with the payment application or wallet application through an application programming interface that the payment application provides, or vice versa.

Alternatively, in some examples the parental control software may include the payment application or wallet application as a module within itself, or the payment application or wallet application may include the parental control software as a module or sub-portion within itself. In these examples, a parent, guardian, or administrator may only need to perform a single configuration of the corresponding software security policy and limitations on user spending. In other examples where these applications are separate and distinct, as discussed above, the parent, guardian, or administrator may optionally set up the configuration within multiple different applications to ensure that they coordinate with each other correctly to apply the software security policy. For example, the parent may set up the software security policy within the parental control software on computing device 202 and then also login to a corresponding website or application for the financial institution and authorize the financial institution to place corresponding limits on user spending, as discussed above. Generally speaking, any configuration or coordination that results in the successful performance of method 300 to protect users from corresponding security threats may satisfy step 308, as discussed further below.

Releasing module 110 may release the resources in a variety of ways. Generally speaking, releasing module 110 may release the resources at least in part by transmitting a network packet, or other item of information, indicating that the software security policy authorizes or approves the corresponding transaction. In configurations where the parental control software also includes a payment application, releasing module 110 may instruct or use the payment application to perform the transaction. In these configurations, releasing module 110 may prevent the use of the payment application in a case where the software security policy does not approve the transaction.

In configurations where the parental control software and the payment application have some degree of separation, the parental control software may transmit a notification to the payment application and/or corresponding financial institution indicating that the parental control software approves of the transaction. Optionally, the parental control software may provide a digital signature, or other proof of authenticity, such that the payment application or corresponding financial institution confirms that the indication of the parental control software approving the transaction is actually authentic. For example, the parental control software may sign the indication of the approval of the transaction using a private key that corresponds to a public key provided by a publisher of the parental control software (e.g., a public-private key pair established by the publisher for a particular installation of the parental control software) such that the payment application or financial institution may verify that one or more messages signed using the corresponding private key are actually authentic.

Figure 5:
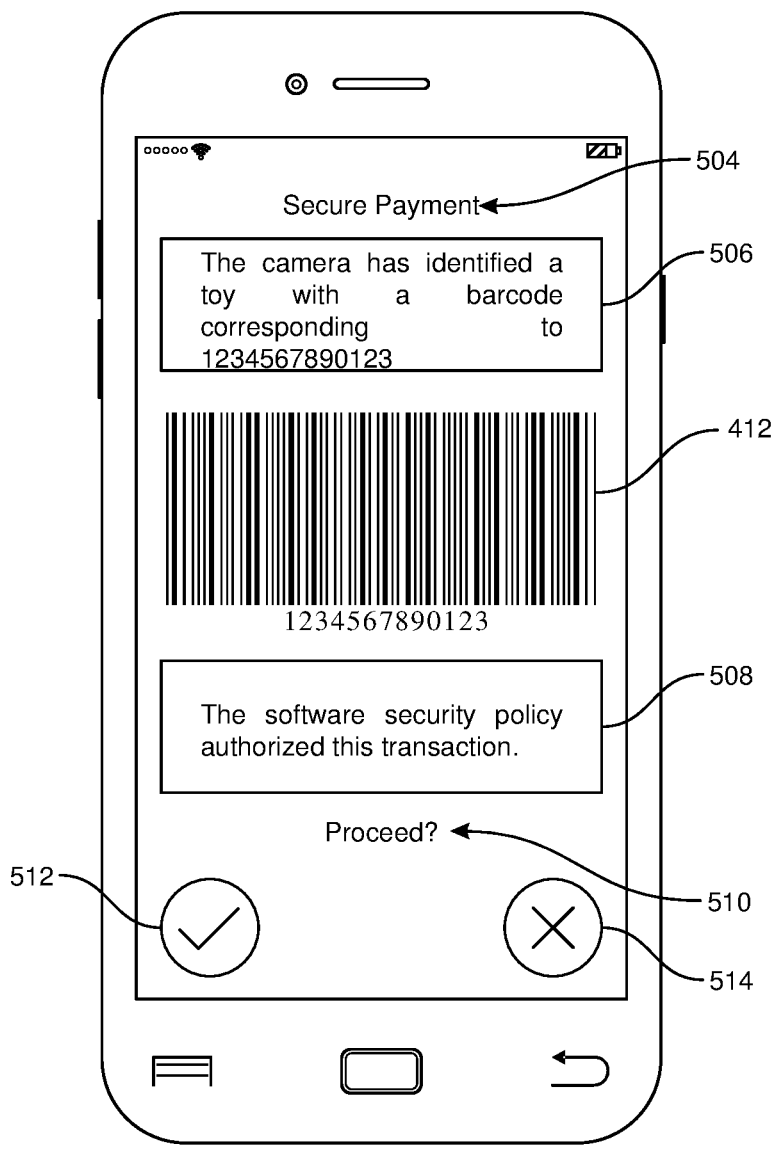
FIG. 5 is a diagram of a smartphone display.

FIG. 5 shows an example smartphone display that may correspond to method 300. Smartphone display 500 may also correspond to callout 404 shown in FIG. 4, as further discussed above. As shown in FIG. 5, the user may use a secure payment application, which may correspond to indicator 504. Moreover, the smartphone display may also optionally include a text notification 506 that notifies the user that the camera has successfully identified the corresponding target. The smartphone display also optionally includes a text notification 508 that further indicates to the user that the software security policy has authorized the corresponding transaction. The smartphone display may also include a text notification 510 requesting for the user to indicate whether to proceed with the transaction or not. The user may proceed with the transaction by toggling an approval button 512 or may prevent the transaction by toggling a rejection button 514.

Prior to the display shown in this figure, the smartphone display may also display one or more notifications that guide the user through the performance of method 300. For example, in response to an attempt by the user to acquire the target without first performing method 300, then the smartphone display may notify the user that the transaction is not yet authorized and/or may instruct the user to capture a photograph of the target in order to release the locked funds, as discussed above.

FIG. 5 shows an example where the user has captured a photograph of a barcode on packaging of a corresponding target, such as a toy for children. Additionally, or alternatively, an embodiment of method 300 may include the user capturing a photograph of a barcode or visual depiction of an identifier for the product that is listed or shown on a bill (e.g., a bill for the product, which may optionally specify the product as just one of a larger number of products that the user is attempting to acquire), and method 300 may be performed based on that photograph as well, or instead of the embodiment of FIG. 4.

Figure 6:
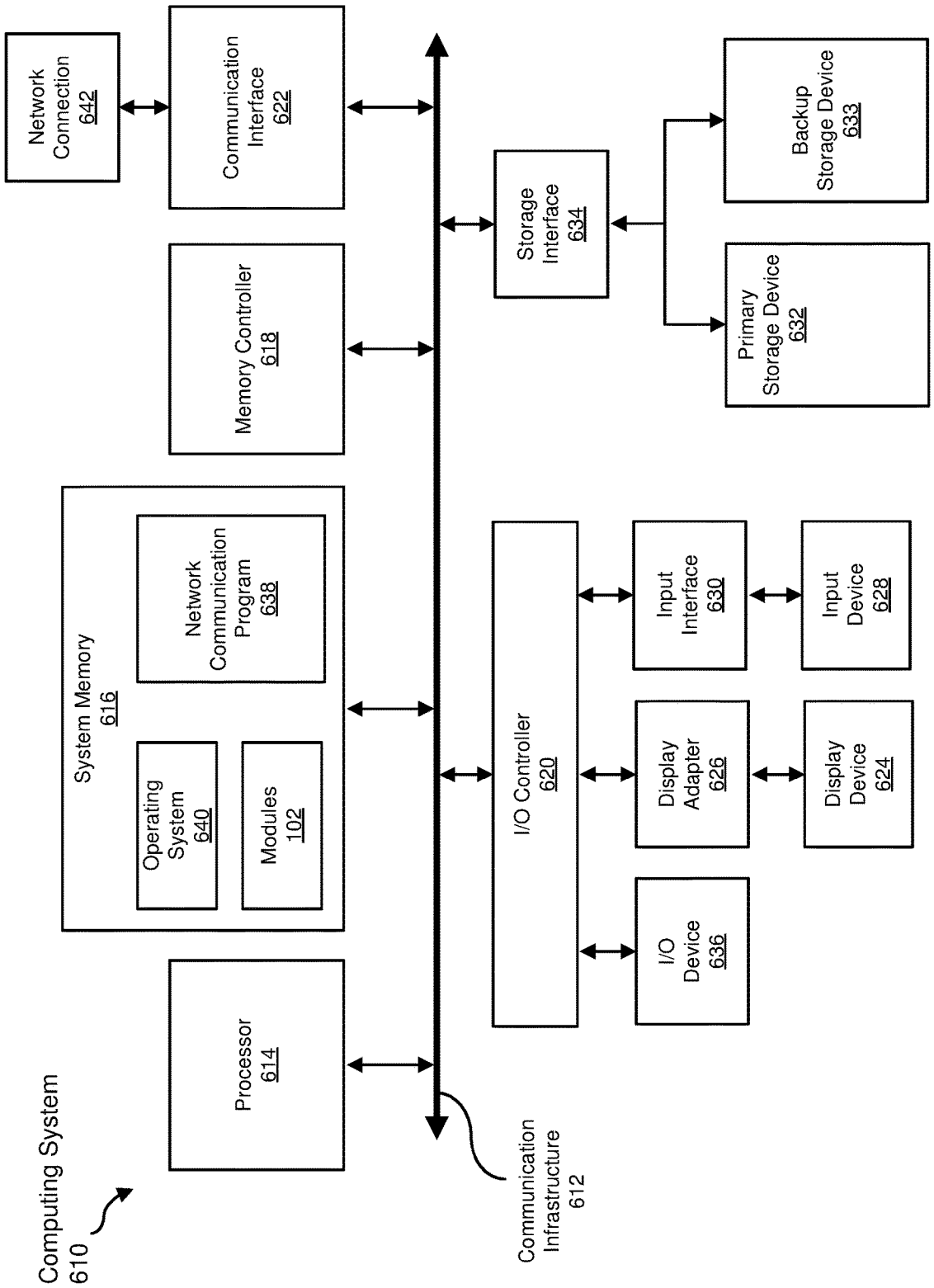
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
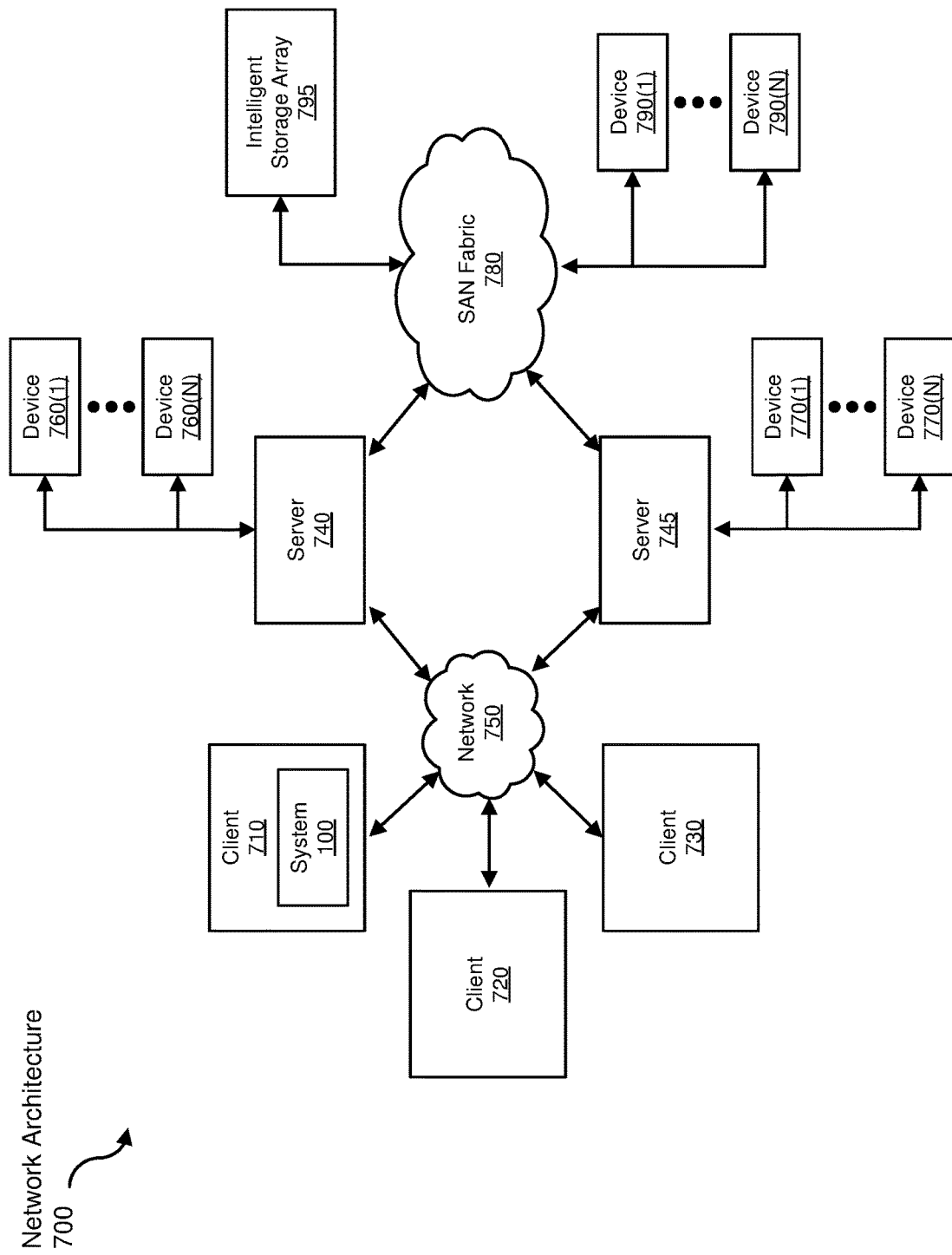
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting users from security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users from security threats, at least a portion of the method being performed by a computing device comprising at least one processor, the method comprising:
   receiving a photograph of a target that a user is attempting to acquire;
   extracting, from the photograph, an identifier of the target;
   applying the identifier of the target to a software security policy that indicates whether the target is safe for the user; and
   releasing locked resources to enable the user to acquire the target based on a determination that the software security policy indicates that the target is safe for the user.

2. The computer-implemented method of claim 1, wherein the extracting the identifier of the target comprises extracting a visual machine-readable code from the photograph.

3. The computer-implemented method of claim 2, wherein the visual machine-readable code comprises a one-dimensional visual machine-readable code.

4. The computer-implemented method of claim 2, wherein the visual machine-readable code comprises a two-dimensional visual machine-readable code.

5. The computer-implemented method of claim 1, wherein the software security policy indicates whether the target poses a threat to the health of the user.

6. The computer-implemented method of claim 5, wherein the software security policy indicates whether the target poses a threat of causing the user to choke.

7. The computer-implemented method of claim 5, wherein the software security policy indicates whether the target poses a threat of starting a fire.

8. The computer-implemented method of claim 1, wherein the software security policy indicates whether the target matches an age of the user.

9. The computer-implemented method of claim 1, wherein a guardian of the user adjusts the software security policy.

10. The computer-implemented method of claim 1, wherein a guardian of the user uploads through crowdsourcing an indication of whether the target poses a threat to the user.

11. A system for protecting users from security threats, the system comprising:
    a reception module, stored in memory, that receives a photograph of a target that a user is attempting to acquire;
    an extraction module, stored in memory, that extracts, from the photograph, an identifier of the target;
    an application module, stored in memory, that applies the identifier of the target to a software security policy that indicates whether the target is safe for the user;
    a releasing module, stored in memory, that releases locked resources to enable the user to acquire the target based on a determination that the software security policy indicates that the target is safe for the user; and
    at least one physical processor configured to execute the reception module, the extraction module, the application module, and the releasing module.

12. The system of claim 11, wherein the extraction module extracts the identifier of the target at least in part by extracting a visual machine-readable code from the photograph.

13. The system of claim 12, wherein the visual machine-readable code comprises a one-dimensional visual machine-readable code.

14. The system of claim 12, wherein the visual machine-readable code comprises a two-dimensional visual machine-readable code.

15. The system of claim 11, wherein the software security policy indicates whether the target poses a threat to the health of the user.

16. The system of claim 15, wherein the software security policy indicates whether the target poses a threat of causing the user to choke.

17. The system of claim 15, wherein the software security policy indicates whether the target poses a threat of starting a fire.

18. The system of claim 11, wherein the software security policy indicates whether the target matches an age of the user.

19. The system of claim 11, wherein a guardian of the user adjusts the software security policy.

20. A non-transitory computer-readable medium comprising one or more computer-readable instructions that, when executed by at least one processor of a computing device, cause the computing device to:
    receive a photograph of a target that a user is attempting to acquire;
    extract, from the photograph, an identifier of the target;
    apply the identifier of the target to a software security policy that indicates whether the target is safe for the user; and
    release locked resources to enable the user to acquire the target based on a determination that the software security policy indicates that the target is safe for the user.

* * * * *